(12) United States Patent
Adams

(10) Patent No.: US 9,648,268 B2
(45) Date of Patent: *May 9, 2017

(54) METHODS AND DEVICES FOR PROVIDING COMPANION SERVICES TO VIDEO

(71) Applicant: BlackBerry Limited, Waterloo (CA)

(72) Inventor: Neil Patrick Adams, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/501,809

(22) Filed: Sep. 30, 2014

(65) Prior Publication Data

US 2015/0015788 A1 Jan. 15, 2015

Related U.S. Application Data

(63) Continuation of application No. 13/583,300, filed as application No. PCT/CA2012/050368 on Jun. 1, 2012, now Pat. No. 8,861,858.

(51) Int. Cl.
| | |
|---|---|
| *H04N 5/445* | (2011.01) |
| *G06F 17/22* | (2006.01) |
| *H04N 21/41* | (2011.01) |
| *H04N 21/433* | (2011.01) |
| *H04N 21/44* | (2011.01) |
| *H04N 21/4725* | (2011.01) |
| *H04N 21/234* | (2011.01) |
| *H04N 21/478* | (2011.01) |

(52) U.S. Cl.
CPC ......... *H04N 5/44513* (2013.01); *G06F 17/22* (2013.01); *H04N 21/234* (2013.01); *H04N 21/4126* (2013.01); *H04N 21/4333* (2013.01); *H04N 21/44008* (2013.01); *H04N 21/4725* (2013.01); *H04N 21/478* (2013.01); *H04N 2005/44521* (2013.01)

(58) Field of Classification Search
CPC ... H04N 21/4722; H04N 21/4725; G06K 9/72
See application file for complete search history.

(56) References Cited

U.S. PATENT DOCUMENTS

| | | | | |
|---|---|---|---|---|
| 5,696,905 A | * | 12/1997 | Reimer | G06Q 30/0623 348/E7.069 |
| 6,025,837 A | * | 2/2000 | Matthews, III | H04N 5/44543 348/E5.105 |
| 6,075,568 A | * | 6/2000 | Matsuura | H04N 5/445 348/478 |
| 6,560,529 B1 | * | 5/2003 | Janssen | G01C 21/28 340/988 |
| 7,720,436 B2 | * | 5/2010 | Hamynen | G06F 3/147 348/116 |

(Continued)

*Primary Examiner* — Pankaj Kumar
*Assistant Examiner* — Timothy Newlin
(74) *Attorney, Agent, or Firm* — Rowand LLP

(57) ABSTRACT

Methods and devices for providing companion services to video are described. In one example embodiment, the method includes: identifying text contained within a video; determining, by performing pattern matching, if the identified text in the video contains actionable text; and if the identified text in the video contains actionable text, providing access to one or more features based on the actionable text.

18 Claims, 8 Drawing Sheets

(56) References Cited

U.S. PATENT DOCUMENTS

| | | | |
|---|---|---|---|
| 8,140,570 B2* | 3/2012 | Ingrassia | G06F 17/30038 706/10 |
| 8,861,858 B2* | 10/2014 | Adams | H04N 21/234 382/181 |
| 2002/0019978 A1* | 2/2002 | Terretta | H04N 7/17318 725/34 |
| 2002/0188959 A1* | 12/2002 | Piotrowski | H04N 5/4401 725/112 |
| 2003/0126608 A1* | 7/2003 | Safadi | H04N 21/234309 725/89 |
| 2004/0181817 A1* | 9/2004 | Larner | H04N 7/163 725/143 |
| 2005/0022252 A1* | 1/2005 | Shen | G06F 17/30017 725/135 |
| 2005/0114888 A1* | 5/2005 | Iilsley | H04N 5/44591 725/53 |
| 2005/0120391 A1* | 6/2005 | Haynie | H04H 60/07 725/135 |
| 2005/0193425 A1* | 9/2005 | Sull | G06F 17/30817 725/135 |
| 2006/0075442 A1* | 4/2006 | Meadow | G06F 17/30241 725/91 |
| 2006/0078207 A1* | 4/2006 | King | H04N 1/00244 382/229 |
| 2006/0179453 A1* | 8/2006 | Kadie | G06Q 30/02 725/34 |
| 2007/0136758 A1* | 6/2007 | Lehikoinen | G06F 3/0481 725/53 |
| 2007/0140595 A1* | 6/2007 | Taylor | G06K 9/00664 382/310 |
| 2008/0002916 A1* | 1/2008 | Vincent | G06K 9/3258 382/305 |
| 2008/0091713 A1* | 4/2008 | Candelore | H04N 7/163 |
| 2008/0115162 A1* | 5/2008 | Yu | G10L 13/00 725/34 |
| 2008/0189736 A1* | 8/2008 | Edwards | G06F 17/3079 725/34 |
| 2008/0297657 A1* | 12/2008 | Griffiths | G09B 21/00 348/564 |
| 2009/0049092 A1* | 2/2009 | Capio | H04N 7/163 |
| 2009/0073315 A1* | 3/2009 | Kikinis | G06K 9/2054 348/473 |
| 2010/0058408 A1* | 3/2010 | LaFreniere | H04N 21/42204 725/106 |
| 2011/0247042 A1* | 10/2011 | Mallinson | G06F 17/30026 725/86 |
| 2011/0289535 A1* | 11/2011 | Saffari | H04N 21/235 725/61 |
| 2012/0030713 A1* | 2/2012 | Begeja | G11B 27/034 725/53 |
| 2013/0097625 A1* | 4/2013 | Thorwirth | G06F 17/30038 725/25 |
| 2013/0291024 A1* | 10/2013 | Lefevre | G06K 9/325 725/60 |
| 2013/0304551 A1* | 11/2013 | Oliver | G06Q 30/02 705/14.16 |
| 2013/0326552 A1* | 12/2013 | Adams | H04N 21/234 725/14 |
| 2015/0015788 A1* | 1/2015 | Adams | H04N 21/234 348/571 |

* cited by examiner

METHODS AND DEVICES FOR PROVIDING COMPANION SERVICES TO VIDEO

CROSS REFERENCE TO RELATED APPLICATIONS

This application is a continuation of U.S. application Ser. No. 13/583,300 which published as US 2013/0326552 A1. U.S. application Ser. No. 13/583,300 was a 371 of international application number PCT/CA2012/050368. The contents of these applications are incorporated herein by reference.

TECHNICAL FIELD

The present disclosure relates to video content and, more particularly, to methods and devices for providing companion services to complement such video content.

BACKGROUND

Videos, such as television shows, movies, commercials, and sporting events, often include content which may be actionable by a user. That is, such videos may include content which a user is permitted or capable of acting upon. For example, a video may include a telephone number which a user may place a call to using a telephone. Similarly, a video may include a website address which a user may visit.

Often, when the user wants to act upon the actionable content, they must recollect some information about the actionable content. For example, if a user wishes to place a telephone call to a phone number displayed in a video, they may need to recollect the phone number in order to place the call to the phone number. Similarly, when a website address is displayed in a video, the user may need to recollect the website address to input the website address into a web browser in order to navigate to the website.

Users sometimes have difficulty acting upon actionable content displayed in a video since such content is often only displayed briefly to the user and may be easily forgotten.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
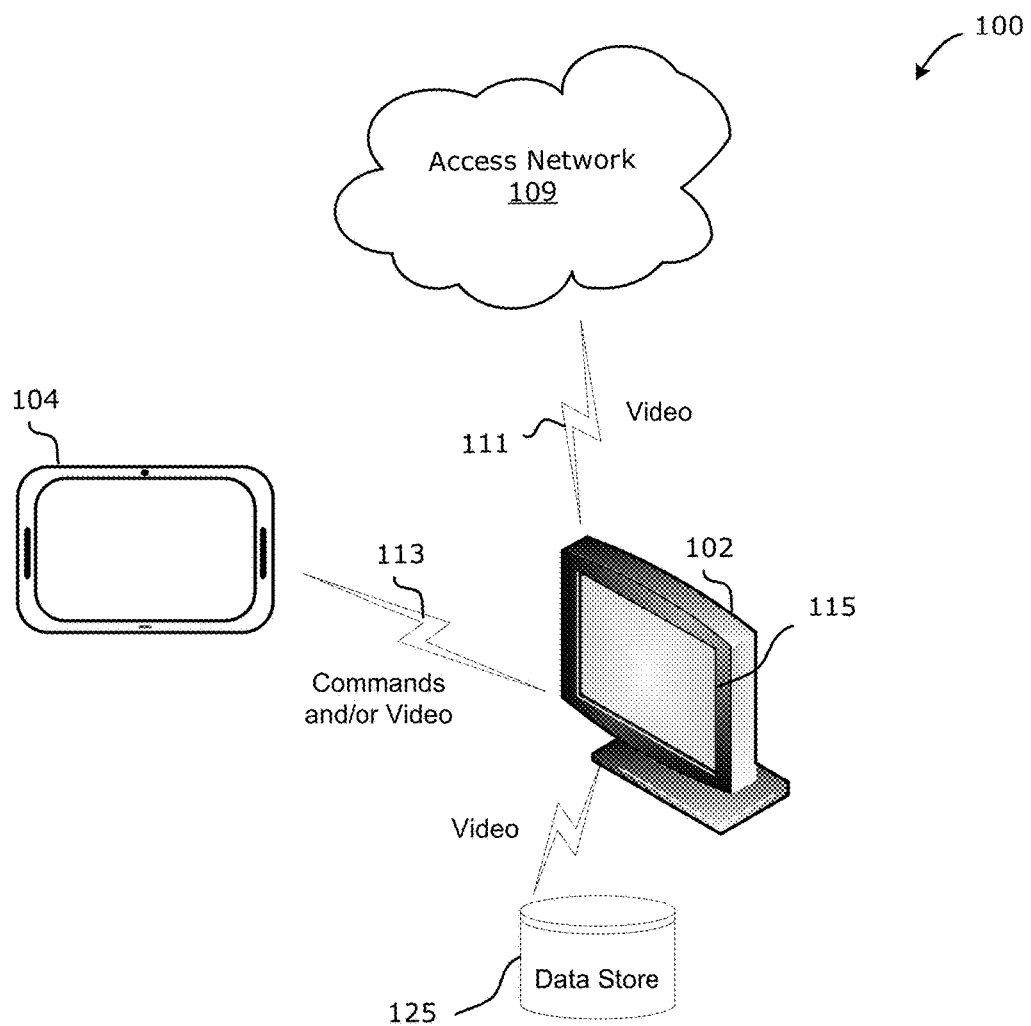
FIG. 1 is a block diagram of a system for providing companion services for a video in accordance with example embodiments of the present disclosure.

In one example embodiment a method performed by a processor is described. The method includes: identifying text contained within a video; determining, by performing pattern matching, if the identified text in the video contains actionable text; and if the identified text in the video contains actionable text, providing access to one or more features based on the actionable text.

In another example embodiment a companion device is described. The companion device includes a display and a short range communications subsystem for providing a video to a media display device for playback on the media display device. The companion device also includes a processor coupled to the display and the short range communications subsystem. The processor is configured to: identify text contained within a video; determine, by performing pattern matching, if the identified text in the video contains actionable text; and if the identified text in the video contains actionable text, provide access to one or more features based on the actionable text.

In another example embodiment, a media display device is described. The media display device includes a display for displaying a video and a short range communications subsystem for sending a command to a companion device to instruct the companion device to provide access to one or more features based on actionable text identified in a video. The media display device also includes a processor coupled to the display and the short range communications subsystem. The processor is configured to: identify text contained within a video; determine, by performing pattern matching, if the identified text in the video contains actionable text; and if the identified text in the video contains actionable text, provide access to one or more features based on the actionable text.

In another example embodiment, a method performed by a processor is described. The method includes: determining if a video includes an actionable object; and if the video includes an actionable object, providing access to one or more companion features based on the actionable object.

In another example embodiment, a companion device is described. The companion device includes a display and a short range communications subsystem for providing a video to a media display device for playback on the media display device. The companion device also includes a processor coupled to the display and the short range communications subsystem. The processor is configured to: determine if a video includes an actionable object; and if the video includes an actionable object, provide access to one or more companion features based on the actionable object. In yet another example embodiment, a media display device is described. The media display device includes a display for displaying a video and a short range communications subsystem for sending a command to a companion device to instruct the companion device to provide access to one or more features based on an actionable object identified in a video. The media display device also includes a processor coupled to the display and the short range communications subsystem. The processor is configured to: determine if a video includes an actionable object; and if the video includes an actionable object, provide access to one or more companion features based on the actionable object.

Other example embodiments of the present disclosure will be apparent to those of ordinary skill in the art from a review of the following detailed descriptions in conjunction with the drawings.

Example System for Providing Companion Services

Referring now to FIG. 1, a block diagram of a system 100 for providing companion services for a video is displayed. The system 100 includes a media display device 102. The media display device 102 is configured to display videos on a display 115 associated with the media display device 102. The videos are, in some example embodiments, television programs. However, the videos may be of other types including, for example, movies, sporting events, commercials, music videos, user-generated and/or user-uploaded videos such as YouTube™ videos, etc.

While the example of FIG. 1 illustrates the media display device 102 using a single block, in practice, the media display device 102 may include a plurality of interconnected components. In some example embodiments, the media display device 102 may include a television. The television may include a display 115 to which the television may output videos. In some example embodiments, the media display device 102 may also include one or more receivers which may be internal or external to the television. The receiver may be configured to receive video signals from an access network such as a cable television system (other types of access networks and video sources will be described in greater detail below). The receiver may take the form of a set-top box (STB). A set-top box is a receiver which is external to a television and which is connected to the television, typically via a wired connector. The set-top box may be configured to receive a video signal from an access network 109, to decrypt and/or otherwise process the video signal, and to output video included in the received video signal to the television.

In some example embodiments, the media display device 102 may take the form of a smart television (TV). A smart TV is a television which offers more advanced computing ability and/or connectivity than a basic, non-smart television. The smart TV may be a television with integrated Internet capabilities. That is, the smart TV may be configured to provide access to Internet-based services.

In some example embodiments, the media display device 102 may include a monitor, which may be connected to a computer system. The computer system may, for example, act as a receiver and receive signals which include videos from an access network 109. The media display device 102 may take other forms apart from those specifically recited herein in other example embodiments.

The system 100 includes a companion device 104. As will be described in greater detail below, in some example embodiments, the companion device 104 is configured to provide companion features for a video displayed on the media display device 102. More particularly, the companion device 104 may be configured to, in at least one operating mode, provide access to one or more features, such as one or more applications associated with the companion device 104, when video displayed on the media display device 102 includes actionable text.

For example, in one operating mode, while video is displayed on a display 115 of the media display device 102, companion features may be provided on the companion device 104 based on the content of the video. For example, text may be identified in the video and pattern matching may be performed on the text to determine if the identified text contains actionable text. That is, pattern matching may be performed to determine whether the video contains displayable text of one or more predetermined type. If text of the predetermined types is included in the video, the video may be said to include actionable text.

Actionable text is text of a type having a feature on the companion device 104 associated therewith. When such actionable text is identified, access may be provided to the feature associated with the actionable text.

By way of further example, in some example embodiments, if a phone number is contained in the video, a selectable option to initiate a telephone call to the phone number may be provided on the companion device 104. For example, an option to call the phone number may be displayed on a display associated with the companion device. By way of example, when a user is watching a television show, such as American Idol™, which allows the user to place a call to a phone number to vote, the user may be presented with a selectable option to place a phone call to the phone number. This allows a user to place a call to a telephone number which was contained as displayable text in a video without having to manually input the phone number into their phone. The user is simply presented with a selectable option to place the phone call on the companion device 104. Selection of the selectable option may be performed by a user using an input interface, such as a touchscreen. Such selection causes the companion device 104 to initiate a telephone call to the phone number.

By way of further example, in some example embodiments, if a web address (such as a Uniform Resource Locator "URL") is identified in the video, a selectable option to navigate to the web page may be provided on the companion device 104, or the companion device may automatically navigate to the web address identified in the video. Similarly, in some example embodiments, if an email address (or other electronic messaging address) is identified in the video, a selectable option to compose an email message (or other electronic message) having a recipient address field populated with the email address (or other electronic messaging address) may be provided on the companion device 104.

By way of further example, in some example embodiments, if a geographic address is identified in the video, then the companion device 104 may provide access to one or more geographic features on the companion device 104 such as one or more geographic applications on the companion device 104. In some example embodiments, a selectable option to display a map associated with the geographic address option may be provided on the companion device 104. For example, such an option may be displayed on the display of the companion device 104 and may be selected with one or more input interfaces (such as a touchscreen display) associated with the companion device 104. In other example embodiments, the companion device 104 may automatically display a map associated with the geographic address if a geographic address is identified in the text of the video. In some example embodiments, a mapping application associated with the companion device may be invoked and a map associated with the geographic address displayed. In some example embodiments, the mapping application may be a remote application and in some example embodiments, the map may be displayed within a web browser of the companion device 104. In some example embodiments, the mapping application may be Google™ Maps, Bing™ Maps, or another web-based mapping application.

In some example embodiments, if a geographic address is identified in the video, then the companion device 104 may provide a selectable option to display directions to the geographic address. Similarly, in some example embodiments, if a geographic address is identified in the video, then the companion device 104 may automatically provide directions to the geographic address. Such directions may, for example, be provided from a default location (such as a user's home location), or may be provided from a location determined from a location sensor associated with the companion device 104, such as a Global Positioning System (GPS) sensor associated with the companion device 104.

In some example embodiments, if contact information is identified in the video, then the companion device 104 may provide a selectable option to store the contact information in an address book associated with the companion device 104. In example embodiments disclosed herein, contact information can be information (e.g. phone numbers, addresses, email addresses, and other information) used to contact a person or an organization (e.g. a business organization, political organization, social organization, educational organization or other organization). That is, a selectable option to create a contact record based on the contact information may be provided. The address book may, in some example embodiments, be a database which is used for storing contact information, for contacts associated with a user of the companion device 104.

In some example embodiments, if a date is identified in the video, then the companion device 104 may provide access to one or more date features on the companion device 104. In some example embodiments, when a date is identified in the video, then the companion device 104 may provide a selectable option to create a calendar event based on the date. The calendar event may, for example, be a meeting request, reminder, or alarm, which is associated with a specific date and/or time.

When a user selects the selectable option to create the calendar event, the companion device 104 may include other data from the frame of the video which included the date when creating the calendar event. In some example embodiments, the calendar event may be created to include, in the calendar event, a screenshot of the frame which included the date. The screenshot may, for example, be embedded into a body portion of the calendar event. Similarly, in some example embodiments, when the companion device 104 creates the calendar event, it may automatically populate one or more fields of the calendar event with other text (i.e. text that is not the date) included in the frame of the video which included the date or text included in other nearby frames of the video (e.g. frames which are shortly before or shortly after the frame including the date). For example, a subject field of the calendar event and/or a body portion of the calendar event may be populated with such text.

Similarly, when a user selects the selectable option to store contact information in an address book associated with the companion device 104, the companion device 104 may include other data from the frame of the video which included the contact information when creating the contact record. In some example embodiments, the contact record may be created to include a screenshot of the frame which included the contact information. For example, when the companion device 104 creates the contact record, it may automatically populate a field in the contact record for storing a picture of the contact, with the screenshot of the frame which included the contact information.

Similarly, the companion device 104 may be configured to, in at least one operating mode, provide access to one or more features, such as one or more applications associated with the companion device 104, when video displayed on the media display device 102 includes an actionable object. In some example embodiments, a displayable object may be identified in the video and an image-based search may be performed using the displayable object to determine if the displayable object is an actionable object. In some example embodiments, an actionable object does not include any text.

An actionable object is a displayable object having a feature on the companion device 104 associated therewith. When such an actionable object is identified, access may be provided to the feature associated with the actionable object. In some example embodiments, an actionable object may be a famous person (such as for example an actor or a historical figure). In some such example embodiments, facial recognition may be performed on a displayable object and, if the displayable object is found to correspond to a famous person having a companion feature associated therewith, then access to the companion feature may be provided. The companion feature may, for example, display information about the person. For example, the companion feature may display a date of birth or date of death. In some example embodiments, where the person is an actor, a list of credits may be displayed. The list of credits may list other videos, such as other movies or television shows, in which the actor has appeared.

In some example embodiments, an actionable object may be associated with a particular location (such as for example a city) or a feature of a location. That is, in some example embodiments, an image-based search may be performed to identify a location or location feature represented in the video. For example, an image-based search may be performed to determine whether one or more features of the location displayed in the video correspond to one or more features stored in a location features database. That is, a building or other feature of a particular location may be identified. (In the example embodiments disclosed herein, a feature of a particular location can be for example a skyline, a landmark, a golf course hole and a natural feature (e.g. the Lone Cypress Tree or Niagara Falls).) In some example embodiments, when a location feature is identified, then access to a companion feature associated with the location in which the feature is located may be provided. The companion feature may, for example, provide information about the location or the location feature, such as a city population, a map illustrating where at the location the feature is located, a map illustrating population density, a list of recent and upcoming events, recommendations for hotels or tourist attractions, etc.

Similarly, in some example embodiments, an actionable object may be a representation of a product. That is, in some example embodiments, an image-based search may be performed to identify a product displayed in video. The product may be an article or substance which is manufactured or refined for sale. By way of example, the product may be a garment, consumer electronic device, food product, etc. When a product is identified, a companion feature associated with that product may be provided. The companion feature may, for example, provide a user with information about the product (such as the name of the product, manufacturer, retail information, etc.). The companion feature may, for example, provide a user with an option to purchase the product.

In some example embodiments, an actionable object may be a bar code (e.g. a quick Response (QR) code, or a universal product code UPC code, or other bar code).

The companion device 104 may be connected to the media display device 102 over a connection 113. The connection 113 allows data to be sent between the companion device 104 and the media display device 102. For example, as will be discussed in greater detail below with reference to FIG. 2, in some example embodiments, a video may be transmitted from the companion device 104 to the media display device 102 via the connection 113. That is, the media display device 102 may, in some example embodiments, receive the video via the connection 113. In other example embodiments, the connection 113 may be used to allow the media display device 102 to send instructions to the companion device 104 when the media display device 102 identifies actionable text and/or actionable objects in a video. That is, in some example embodiments, the media display device 102 may analyze the video to determine whether the video contains actionable text or an actionable object. If actionable text is located, the media display device 102 may send a command to the companion device 104 from the media display device 102 instructing the companion device 104 to provide access to the one or more features based on the actionable text. If an actionable object is located, then the media display device 102 may send a command to the companion device 104 from the media display device 102 instructing the companion device 104 to provide access to the one or more features based on the actionable object.

The connection 113 may include one or more cables, links or media interfaces. The connection 113 between the media display device 102 and the companion device 104 may, in some example embodiments, be a wired connection. In some example embodiments, the connection may be a High Definition Media Interface (HDMI™) connection.

In some example embodiments, the connection 113 may be a wireless connection. In some example embodiments, the media display device 102 and the companion device 104 may be equipped with short range communication subsystems which allow the media display device 102 and the companion device 104 to communicate wirelessly over a wireless connection. In some example embodiments, the media display device 102 may connect directly to the companion device 104 via a Wi-Fi connection. Similarly, in some example embodiments, the media display device 102 may connect to the companion device 104 via a Bluetooth™ connection. Accordingly, in some example embodiments, the media display device 102 may be configured to communicate with the companion device 104 via short range communication technology. That is, a short range connection may be established between the media display device 102 and the companion device 104.

The connection 113 may, in some example embodiments, be an indirect connection. In some example embodiments, the companion device 104 and the media display device 102 may connect to one another via a network, such as the Internet or an intranet. Each of the companion device 104 and the media display device 102 may be configured to connect to the network. Data may be sent between the companion device 104 and the media display device 102 via the network by using unique identifiers, such as an Internet Protocol (IP) addresses associated with the companion device 104 and/or the media display device 102.

In the example embodiment illustrated, the companion device 104 is a tablet computer. A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the companion device 104 may take other forms. In various example embodiments the companion device 104 may be a multi-mode communication device configured for both data and voice communication, a mobile telephone such as a smartphone, a wearable computer such as a watch, a PDA (personal digital assistant), a computer system such as a desktop, netbook, laptop, or notebook computer system, or another electronic device not specifically recited herein.

Videos may be provided to the media display device 102 in a number of different ways. In some example embodiments, the videos may be received from an access network 109 to which the media display device 102 connects. That is, the media display device 102 may be configured to connect directly to the access network to receive video directly through a connection 111. In some example embodiments, the access network 109 may be a television broadcast network. For example, the access network 109 may be a cable television system which delivers broadcast and/or on-demand videos primarily through wired transmission mediums such as fibre-optic and/or coaxial cables. In such example embodiments, the media display device 102 may, for example, include a connector, such as a coaxial cable connector, which connects the media display device 102 to the cable television system through a connection 111 (which may, for example, be a cable or a network of cables which connects the media display device 102 to a back-end head end associated with the cable television system provider).

Similarly, in some example embodiments, the access network 109 may be a satellite television system which delivers broadcast and/or on-demand videos through one or more satellites (not shown). In such example embodiments, the media display device 102 may connect to the access network 109 via a wireless connection 111. That is, a satellite may wirelessly transmit videos to a receiver associated with the media display device 102. The receiver may, for example, include or be connected to a satellite dish which is directed at the satellite.

Similarly, in some example embodiments, the access network 109 may be a terrestrial television system. The terrestrial television system may distribute videos by transmitting such videos as radio waves using antennas. That is, the terrestrial television system may distribute videos to the media display device 102 using a wireless connection 111. The terrestrial television system may, in some example embodiments, be referred to as an over-the-air (OTA) television system. In some example embodiments, the media display device 102 may include or be connected to one or more tuners which converts a radio frequency analog or digital television transmission into video. The tuner may be configured to operate according to one or more television standard such as Phase Alternating Line (PAL), National Television System Committee (NTSC), Advanced Television Systems Committee (ATSC), etc.

In some example embodiments, the access network 109 may be an Internet-based video delivery system. In some example embodiments, the access network 109 may include one or more servers which store video content, such as one or more web servers which connect to the media display device 102 through an Internet provider. That is, the media display device 102 may connect to the Internet and may access one or more servers, such as web servers, operating in the access network 109 which serve one or more videos. In some example embodiments, the media display device 102 may connect to one or more web servers, such as YouTube™ through the Internet. The web servers may serve video to the media display device 102 through the connection 111.

In other example embodiments, the video may be provided to the media display device 102 in another way, which may not rely on the access network 109. In some example embodiments, the media display device 102 may include or be connected to a data store 125. The data store 125 may store one or more videos and may provide such videos to the media display device 102. The data store 125 may be any removable or non-removable media which is capable of storing a video. In some example embodiments, the data store may be an optical storage device, such as a BlueRay™ or Digital Video Disk (DVD) player which receives an optical storage medium storing the video. In other example embodiments, the data store 125 may be a hard disk drive (HDD) or flash drive which stores the video. Other types of data stores 115 may be used in other example embodiments.

Depending on the processing capabilities of the media display device 102 and/or the companion device 104 and the manner by which the video is received at the media display device 102, the analysis of the video to identify actionable text may be performed on the media display device 102, the companion device 104, or both. That is, in some example embodiments, the media display device 102 may be configured to analyze video and to determine whether the video contains actionable text displayed in the video (such as a phone number, website address, information network identifier (such as a Twitter™ address and/or hash tag), geographic address, date, and/or electronic messaging address) and/or to determine whether the video contains an actionable object displayed in the video (such as for example, a famous person, location feature, a product or a bar code).

In some such example embodiments, where actionable text and/or an actionable object is identified, the media display device 102 may provide access to one or more companion features on the companion device 104 by sending a suitable command or instruction to the companion device 104, instructing the companion device 104 to provide access to the feature. For example, where a phone number is identified, the media display device 102 may instruct the companion device 104 to display a selectable option to initiate a telephone call to that phone number. Where a website address is identified, the media display device 102 may instruct the companion device 104 to display a selectable option to navigate to the website address using a web browser. Where an email address is identified, the media display device 102 may instruct the companion device 104 to provide a selectable option to compose an email having a recipient address field populated with the email address. Similarly, where a geographic address is identified, the media display device 102 may instruct the companion device 104 to provide a selectable option to display a map associated with the geographic address or may instruct the companion device 104 to automatically display a map associated with the geographic address. In some example embodiments, if contact information is identified, the media display device 102 may instruct the companion device 104 to provide a selectable option to store the contact information in an address book. Similarly, in some example embodiments, if a date is identified, the media display device 102 may instruct the companion device 104 to provide a selectable option to create a calendar event based on the date.

Similarly, if a famous person is identified, the media display device 102 may instruct the companion device 104 to provide a selectable option to display information for that person (such as a list of credits, a date of birth, date of death, or other biographical information). If the video contains an object associated with a location or a feature of a location, such as a building or skyline associated with the location, then the media display device 102 may instruct the companion device 104 to provide a selectable option to display information associated with that location or location feature (such as city population, a map illustrating where at the location a building is located, a map illustrating population density, a list of recent and upcoming events, recommendations for hotels or tourist attractions, etc.) Similarly, if a known product is identified in the video, then the media display device 102 may instruct the companion device 104 to provide a selectable option to display information associated with the product and/or to provide a selectable option to purchase the product. If a bar code is identified in the video, then the media display device 102 may instruct the companion device 104 to provide a selectable option to scan the bar code and display information associated with the bar code.

Other types of instructions may be provided in other example embodiments.

In other example embodiments, the video may be analyzed on the companion device 104. That is, the companion device 104 may analyze the video to identify actionable text and/or actionable objects displayed in the video and may provide access to companion features, such as the companion features described above, when actionable text and/or actionable objects are identified.

Figure 2:
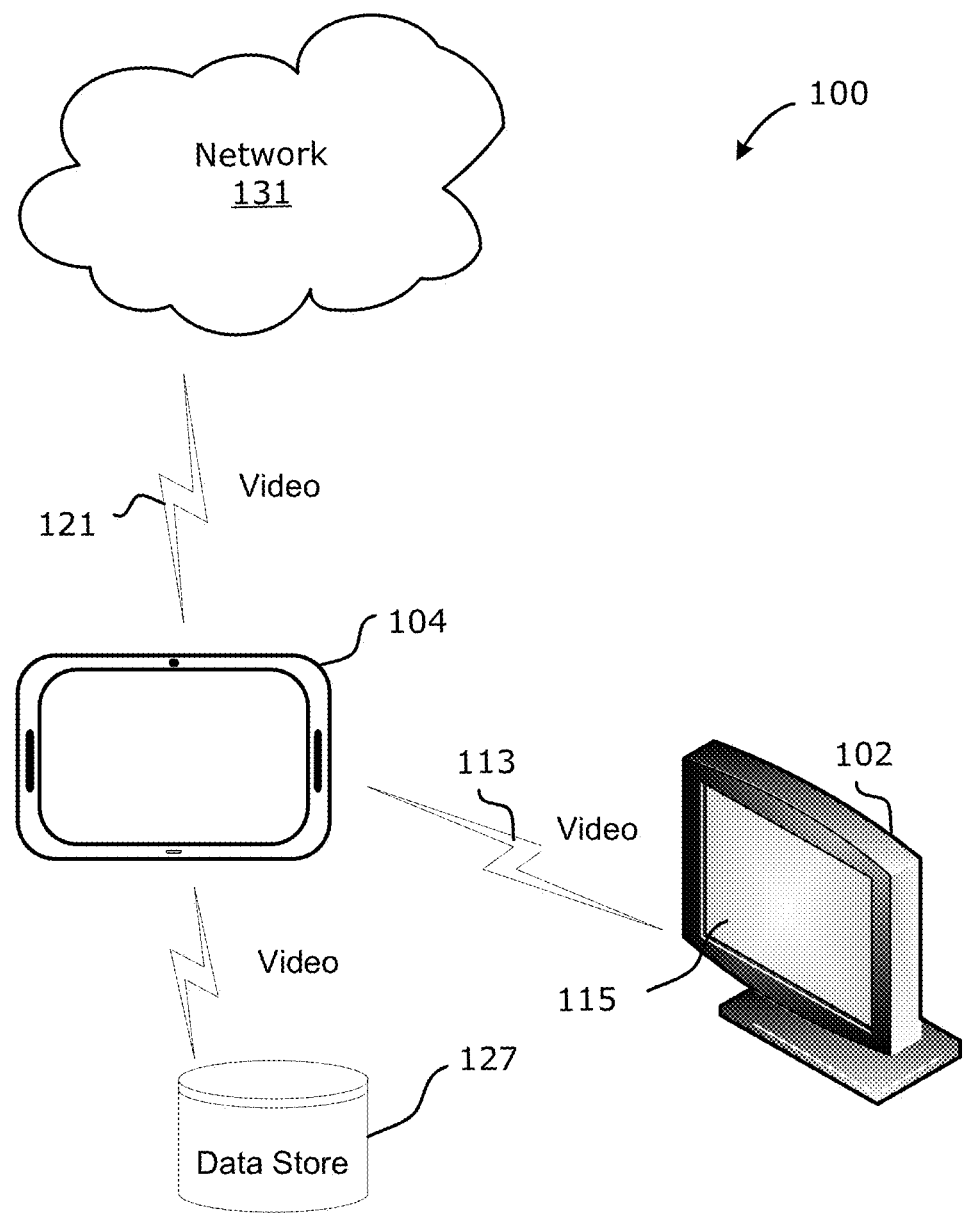
FIG. 2 is a block diagram of a further system for providing companion services for a video in accordance with example embodiments of the present disclosure.

While FIG. 1 illustrates an example embodiment in which the video is received at the media display device 102 via a connection to the access network 109 or the data store 125, in other example embodiments, the video may be received at the media display device 102 via the connection 113 with the companion device 104. For example, the video may be streamed from the companion device 104 to the media display device 102 over the connection 113. Referring now to FIG. 2, one such example embodiment is illustrated.

In the example embodiment of FIG. 2, the video is transmitted from the companion device 104 to the media display device 102 over the connection 113 between these devices. In some example embodiments, the companion device 104 may stream the video to the media display device 102 over the connection 113. In some example embodiments, the companion device 104 may act as a media player for the media display device 102. The media display device 102 may act as a passive display device, displaying a video signal received from the companion device 102.

The companion device 104 may be provided with the video from any one of a number of different sources. In some example embodiments, the videos may be received from a network 131 to which the companion device 104 connects.

That is, the companion device 104 may be configured to connect to a network 131 to receive video through a connection 121. The network 131, in some example embodiments, includes the Internet. More particularly, in some example embodiments, the companion device 104 may receive the video from one or more Internet-based content servers, such as one or more web servers which are configured for delivery of video. In some example embodiments, the video may be received at the companion device 104 from a Netflix™ or Youtube™ server.

The connection 121 which connects the companion device 102 to the network 131 may be a wired connection, a wireless connection, or a combination thereof. In some example embodiments, the connection 121 may be a Wi-Fi connection. In some example embodiments, the connection 121 may be a 3G, 4G or other type of data connection.

In other example embodiments, the video may be provided to the companion device 102 in another way, which may not rely on the network 131. In some example embodiments, the companion device 104 may include or be connected to a data store 127. The data store 127 may store one or more videos. The companion device 104 may be connected to the data store 127 to receive videos from the data store 127. In some example embodiments, the data store 127 may be internal memory of the companion device 104 such as, for example, internal flash memory. In other example embodiments, the data store 127 may be external to the companion device 104. For example, the data store 127 may be removable memory, such as a removable flash card or stick.

In some example embodiments, the companion device 104 may provide the video to the media display device 102 through the connection 113 between those devices and may also analyze the video to identify actionable text (such as a phone number, website address, information network identifier (such as a Twitter™ address and/or hash tag), geographic address, date, electronic messaging address, etc.) and/or actionable objects (such as for example famous persons, location features, products and bar codes) contained therein. When actionable text is identified, the companion device 104 may provide access to a feature of the companion device 104 associated with the actionable text. For example, when a phone number is identified, the companion device 104 may provide access to a phone-related feature; for example, it may provide a selectable option to place a call to the phone number. Where a website address is identified, the companion device 104 may display a selectable option to navigate to the website address using a web browser. Where an email address is identified, the companion device 104 may provide a selectable option to compose an email having a recipient address field populated with the email address. Similarly, where a geographic address is identified, the companion device 104 may provide a selectable option to display a map associated with the geographic address or may automatically display a map associated with the geographic address. In some example embodiments, if contact information is identified, the companion device 104 may provide a selectable option to store the contact information in an address book. Similarly, in some example embodiments, if a date is identified, the companion device 104 may provide a selectable option to create a calendar event based on the date. Similarly, if an information network identifier (such as a Twitter™ address and/or hash tag) is identified, the companion device 104 may provide a selectable option to access the information network associated with the information network identifier (such as, for example, a selectable option to follow a person associated with the information network identifier (e.g. to follow a specific Twitter™ user), a selectable option to view micro-blog entries associated with the information network identifier (e.g. to view Tweets associated with a specific Twitter™ user), and/or a selectable option to search an information network using the information network identifier (e.g. to search Twitter™ using a specific hash tag)).

Similarly, if a famous person is identified, the companion device 104 may display a selectable option to display information for that person (such as a list of credits, a date of birth, date of death, or other biographical information), or may automatically display such information. If the video contains an object associated with a location or a location feature such as a city, such as a building or skyline associated with the location, then the companion device 104 may display a selectable option to display information associated with that location or location feature (such as a city population, a map illustrating where a building is located, a map illustrating population density, a list of recent and upcoming events, recommendations for hotels or tourist attractions, etc.), or may automatically display such information. Similarly, if a known product is identified in the video, then the companion device 104 may display a selectable option to display information associated with the product and/or to provide a selectable option to purchase the product. If a bar code is identified in the video, then the companion device 104 may display a selectable option to scan the bar code and display information associated with the bar code.

Example Companion Device

An overview having been provided, reference will now be made to FIG. 3, which illustrates an example companion device 104.

In the illustrated example embodiment, the companion device 104 is a mobile communication device. In some example embodiments, the mobile communication device is a two-way communication device having data and possibly voice communication capabilities, and the capability to communicate with other computer systems; for example, via the internet. However, in other example embodiments, the companion device 102 may be of a type not specifically listed above.

Figure 3:
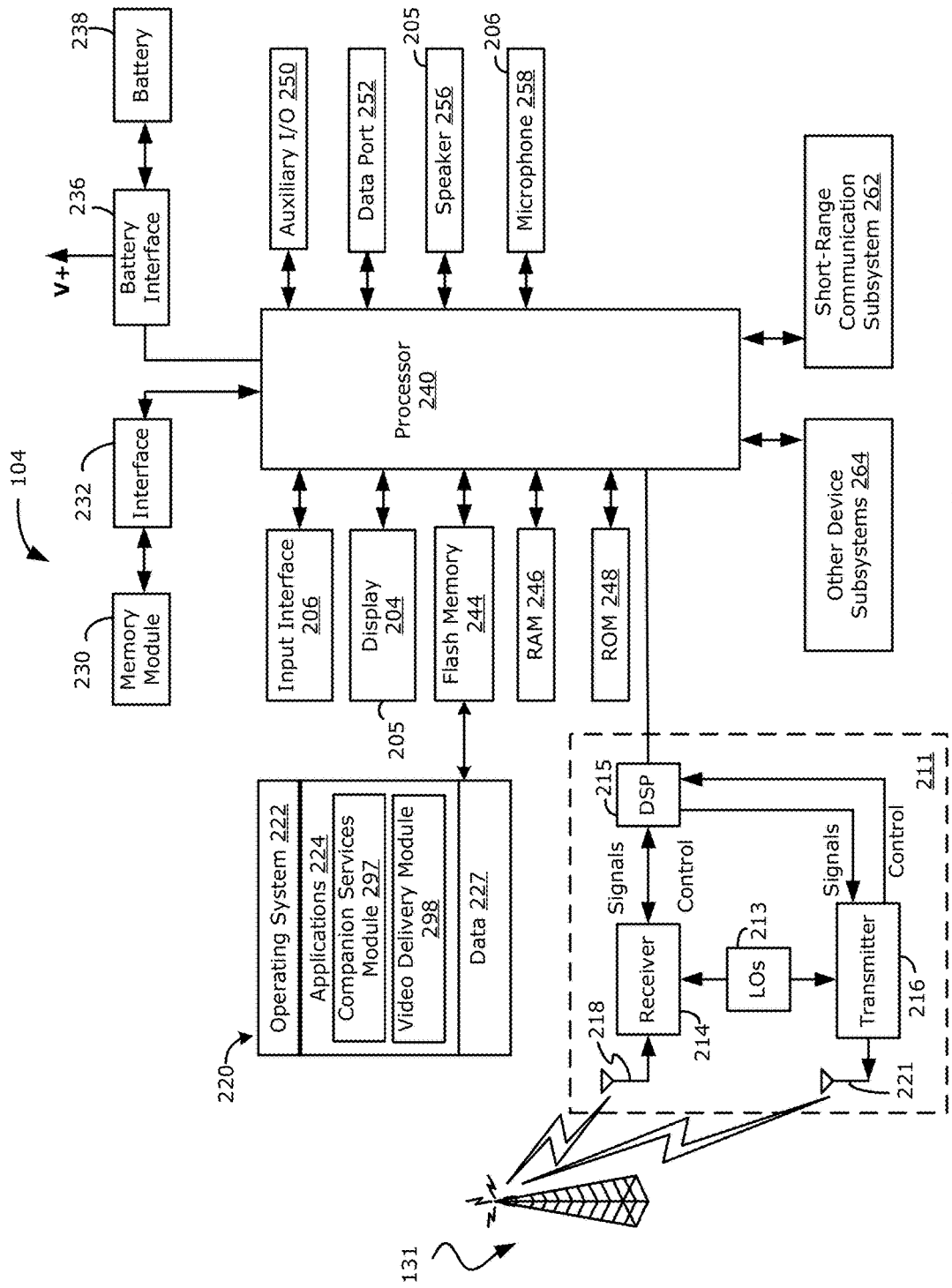
FIG. 3 is a block diagram of a companion device in accordance with example embodiments of the present disclosure.

The companion device 104 of FIG. 3 includes a housing (not shown) which houses components of the companion device 104. Internal components of the companion device 104 may be constructed on a printed circuit board (PCB). The companion device 104 includes a controller including at least one processor 240 (such as a microprocessor) which controls the overall operation of the companion device 104. The processor 240 interacts with device subsystems such as a wireless communication subsystem 211 for exchanging radio frequency signals with a wireless network 131 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 3 perform communication-related functions, whereas other subsystems may provide "resident" or on-device functions.

The companion device 104 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the companion device 104 and a single antenna may be shared by both receiver 214 and transmitter 216, as is known in the art. The particular design of the wireless communication subsystem 211 depends on the wireless network 131 in which the companion device 104 is intended to operate.

The companion device 104 may communicate with any one of a plurality of fixed transceiver base stations of the wireless network 131 within its geographic coverage area. The companion device 104 may send and receive communication signals over the wireless network 131 after the required network registration or activation procedures have been completed. Signals received by the antenna 218 through the wireless network 131 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 131 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The companion device 104 may include other wireless communication interfaces for communicating with other types of wireless networks; for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the companion device 104 such as receipt of an electronic message or incoming phone call, or for other purposes such as haptic feedback (touch feedback).

In some example embodiments, the companion device 104 also includes a removable memory module 230 (typically including flash memory) and a memory module interface 232. Network access may be associated with a subscriber or user of the companion device 104 via the memory module 230, which may be a Subscriber Identity Module (SIM) card for use in a GSM network or other type of memory module for use in the relevant wireless network type. The memory module 230 may be inserted in or connected to the memory module interface 232 of the companion device 104.

The companion device 104 may store data 227 in an erasable persistent memory, which in some example embodiments is the flash memory 244. In various example embodiments, the data 227 may include service data having information required by the companion device 104 to establish and maintain communication with the wireless network 131. The data 227 may also include user application data such as email messages, address book and contact information, calendar and schedule information, notepad documents, image files, and other commonly stored user information stored on the companion device 104 by its user, and other data.

In some example embodiments, the data 227 may include video. That is, in some example embodiments, the video may be stored on the memory of the companion device 104. The memory may act as the data store 127 described above with reference to FIG. 2. However, as noted in the discussion of FIGS. 1 and 2 above, in other example embodiments, the video may be stored elsewhere.

The data 227 stored in the persistent memory (e.g. flash memory 244) of the companion device 104 may be organized, at least partially, into a number of databases or data stores each containing data items of the same data type or associated with the same application. For example, email messages, contact records, and task items may be stored in individual databases within the companion device 104 memory.

The data port 252 may be used for synchronization with a user's host computer system. The data port 252 enables a user to set preferences through an external device or software application and extends the capabilities of the companion device 104 by providing for information or software downloads to the companion device 104 other than through the wireless network 131. The alternate download path may for example, be used to load an encryption key onto the companion device 104 through a direct, reliable and trusted connection to thereby provide secure device communication.

In some example embodiments, the companion device 104 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their companion device 104 to the host computer system via a USB cable or Bluetooth® connection, traffic that was destined for the wireless network 131 is automatically routed to the companion device 104 using the USB cable or Bluetooth® connection. Similarly, any traffic destined for the wireless network 131 is automatically sent over the USB cable Bluetooth® connection to the host computer for processing.

The companion device 104 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the companion device 104, and the battery interface 236 provides a mechanical and electrical connection for the battery 238. The battery interface 236 is coupled to a regulator (not shown) which provides power V+ to the circuitry of the companion device 104.

The short-range communication subsystem 262 provides for communication between the companion device 104 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices. In some example embodiments, the short range communication subsystem may be configured for Wi-Fi communications.

As noted in the discussion of FIGS. 1 and 2 above, the short range communication subsystem 262 may permit the companion device 104 to communicate with the media display device 102. In some example embodiments, a video may be transmitted to or from the companion device 104 via the short range communication subsystem 262. Similarly, in some example embodiments, one or more instructions or commands may be received over the short range communication subsystem 262.

In some example embodiments, another component of the companion device 104 may be used for communications between the companion device 104 and the media display device 102. For example, as noted above, in some example embodiments, the connection 113 (FIGS. 1 and 2) between the devices may be a wired connector, such as an HDMI connector. Accordingly, in some example embodiments, other components of the companion device 104 (such as an auxiliary I/O 250) may be used for communications between the companion device 104 and the media display device 102.

A predetermined set of applications that control basic device operations, including data and possibly voice communication applications may be installed on the companion device 104 during or after manufacture. Additional applications and/or upgrades to an operating system 222 or software applications 224 may also be loaded onto the companion device 104 through the wireless network 131, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory; for example, in the flash memory 244. As illustrated in FIG. 3, the software modules 220 may include operating system software 222 and one or more additional applications 224 or modules such as, for example, a companion services module 297 and/or a video delivery module 298. In the example embodiment of FIG. 3, the companion services module 297 and the video delivery module 298 are illustrated as separate stand-alone applications 224, but in other example embodiments, these modules could be implemented as part of the operating system 222 or another application 224 and/or provided in a single software module which provides the functions of both the companion services module 297 and also the video delivery module 298. Furthermore, the functions of any one or more of the companion services module 297 and/or the video delivery module 298 could be split up and provided by a plurality of modules.

In some example embodiments, the video delivery module 298 is configured to deliver video to the media display device 102 (FIG. 2). The video may, in some example embodiments be retrieved by the companion device 104 from a local or remote data store 127 (FIG. 2) and may, in some example embodiments, be obtained from a web server connected to a network 131 (FIG. 2). The video delivery module 298 may, in some example embodiments, be delivered to the media display device 102 in a streaming fashion. That is, the video may be delivered as a steady, continuous stream, allowing playback to proceed while subsequent data is being sent from the companion device 104 and received at the media display device 102.

As discussed above, the video may be delivered to the media display device 102 using other techniques in other example embodiments. Accordingly, the video delivery module 298 may be excluded in some example embodiments.

In some example embodiments, the companion services module 297 is configured to provide a user of the companion device 104 with access to companion services on the companion device 104. Companion services are services which complement a video. More particularly, companion services may be one or more features associated with the companion device 104 which may use or rely on actionable text or actionable objects displayed in the video. Actionable text is text which may be acted upon. By way of example, actionable text may be a phone number, a date, an address such as an electronic messaging address (e.g. an email address), information network identifier (such as a Twitter™ address and/or hash tag), a geographic address, a website address, etc. As discussed earlier in this disclosure, actionable objects are objects which are displayed in the video and which may be acted upon. Such objects may be "known" in that they are represented in an actionable object database.

When actionable text or actionable objects are included as displayable text or displayable objects in a video, the companion device 104 may provide access to one or more features of the companion device 104 associated with such actionable text or actionable objects. For example, when actionable text or an actionable object is identified in a video, the companion services module 297 may, in some example embodiments, provide a selectable option to access a feature associated with the actionable text or actionable object. The feature may depend on the specific nature of the identified text or object identified. For example, when a phone number is identified, the companion services module 297 may provide access to a phone feature. For example, a user may be presented with an option to place a phone call to the identified phone number. Selection of the selectable option to place a phone call to the identified number may cause a phone application associated with the companion device 104 to be engaged and a phone call to be initiated to the phone number.

Similarly, in some example embodiments, when a website address is identified in the video, the companion services module 297 may display a selectable option to navigate to the identified website address. Selection of the selectable option to navigate to the website address may cause an Internet browser associated with the companion device 104 to navigate to the identified website address. In some example embodiments, a parameter may be added to the website address when navigating to the website address to allow a web server associated with the website address to associate access of the website with a referrer. That is, an identifier associated with a referrer may be added to the website address (which may be a URL). The identifier may be unique to a referrer to allow the web server to identify the referrer. The referrer may, for example, be the manufacturer and/or distributor of the companion device and/or a software developer associated with the companion services module 297. Tracking the referrer may, for example, allow the referrer to receive compensation from an operator of the web server for the referral.

Similarly, in some example embodiments, if an email address (or other electronic messaging address) is identified in the video, the companion services module 297 may display a selectable option to compose an email message (or other electronic message) having a recipient address field populated with the email address (or other electronic messaging address). Selection of the selectable option may cause an electronic messaging application to be engaged to compose or send a message and the address field of the message may be automatically populated with the identified electronic messaging address.

By way of further example, in some example embodiments, if a geographic address is identified in the video, then the companion services module 297 may provide access to one or more geographic features on the companion device 104 such as one or more geographic applications on the companion device 104. In some example embodiments, the companion services module 297 may display a selectable option to display a map associated with the geographic address. For example, such an option may be displayed on the display of the companion device 104 and may be selected with one or more input interfaces (such as a touchscreen display) associated with the companion device 104. In other example embodiments, the companion device 104 may automatically display a map associated with the geographic address if a geographic address is identified in the text of the video. In some example embodiments, a mapping application associated with the companion device may be invoked and a map associated with the geographic address displayed. In some example embodiments, the mapping application may be a remote application and the map may be displayed within a web browser of the companion device 104. In some example embodiments, the mapping application may be Google™ Maps, Bing™ Maps, or another web-based mapping application.

In some example embodiments, if a geographic address is identified in the video, then the companion device 104 may provide a selectable option to display directions to the geographic address. Selection of the selectable option may cause a navigation application to be engaged and may cause the navigation application to generate directions to the identified geographic address. Such directions may, for example, be provided from a default location (such as a user's home location), or may be provided from a location determined from a location sensor associated with the companion device 104, such as a Global Positioning System (GPS) sensor associated with the companion device 104.

In some example embodiments, if contact information is identified in the video, then the companion services module 297 may provide a selectable option to store the contact information in an address book associated with the companion device 104. That is, a selectable option to create a contact record based on the contact information may be provided. The address book may, in some example embodiments, be a database which is used for storing contact information, such as phone numbers, addresses, email addresses, and other information, for contacts associated with a user of the companion device 104. Selection of the selectable option to store the address in the address book may cause an address book application to be engaged and/or a contact record to be created based on the identified address.

In some example embodiments, if a date is identified in the video, then the companion services module 297 may provide access to one or more date-related features on the companion device 104. In some example embodiments, when a date is identified in the video, then the companion device 104 may provide a selectable option to create a calendar event based on the date. The calendar event may, for example, be a meeting request, reminder, alarm, etc. In some example embodiments, selection of the selectable option to create a calendar event based on the date may cause a calendar application, such as, for example, Microsoft Outlook™, to be engaged and a calendar event created based on the identified date. In some example embodiments, after a calendar event is created, when the appointed time is reached, the calendar event may trigger a reminder on the companion device 104 to remind a user of the companion device 104 of the calendar event.

As noted previously, if an object representing a famous person is identified, the companion device 104 may display a selectable option to provide access to one or more personal information providing features on the companion device 104. For example, a selectable option to display information for that person (such as a list of credits, a date of birth, date of death, or other biographical information) may be displayed.

Similarly, if the video contains an object associated with a location or a location feature, such as a building or skyline associated with the location, then the companion device 104 may display a selectable option to display information associated with that location or location feature (such as a city population, a map illustrating where at the location the feature is located, a map illustrating population density, a list of recent and upcoming events, recommendations for hotels or tourist attractions, etc.), or may automatically display such information.

If a known product is identified in the video, then the companion device 104 may display a selectable option to display information associated with the product and/or to provide a selectable option to purchase the product.

Similarly, if a bar code is identified in the video, then the companion device 104 may display a selectable option to scan the bar code and display information associated with the bar code. Accordingly, the companion services module 297 may provide access to one or more companion services on the companion device 104. Such services may be provided by or rely on one or more application or module on the companion device 104 such as a phone application (not shown), calendar application (not shown), address book application (not shown), electronic messaging application (not shown) or another application not specifically recited.

In some example embodiments in which the companion device 104 has access to the video, the companion services module 297 may analyze the video to identify displayable text in the video and to determine whether any of the identified text in the video contains actionable text. For example, the companion services module 297 may perform pattern matching on the video to determine whether any of the identified text in the video appears to represent actionable text. Pattern matching may compare text strings to one or more predetermined templates associated with actionable text. In example embodiments disclosed herein, actionable text may include characters that are alphabetic or non-alphabetic (e.g. numbers, symbols (such as '#', '@', '/' and '-'), or punctuation marks (such as '.')). For example, a template for a website address may require that the address include "www" followed by a period, followed by a text string, followed by another period, followed by another text string (i.e. www.text_string.text_string). When identified text in the video matches this pattern, then the companion services module 297 may determine that the text is a website address and may provide access to companion services for that website address. Similar predetermined templates may be used to pattern match an email address, a phone number, an information network identifier (such as for example a Twitter hash tag or a Twitter address) or other information having a particular pattern.

Similarly, in some embodiments, the companion services module 297 may analyze the video to identify displayable objects in the video and to determine whether any of the identified objects are actionable objects. For example, the companion services module 297 may perform image-based searching based on one or more frames of the video to identify objects. The image-based searching may compare features of objects in the video to object features in an actionable object database. The actionable object database may define features of objects which are considered to be actionable. For example, the actionable object database may include sample images of actionable objects. In some such example embodiments, the image-based search may attempt to determine whether the object identified in the video corresponds to any sample images in the actionable object database. If an object is contained in the video which corresponds to an object in the actionable object database, then the companion services module 297 may provide companion services for the identified object.

As noted in the discussion of FIG. 1, in some example embodiments, the companion device 104 may not have access to the video. Accordingly, in some example embodiments, the analysis of the video may be performed by the media display device 102. That is, the media display device 102 may be configured to analyze the video to identify displayable text and to determine whether any of the identified text in the video contains actionable text, and/or may be configured to analyze the video to identify displayable objects and to determine whether any of the identified objects are actionable objects. Based on the result of this analysis, the media display device 102 may send one or more suitable instructions or commands to the companion device 104 to instruct the companion device 104 to provide access to companion features associated with the identified actionable text and/or identified actionable objects. Upon or after receiving such instructions, the companion services module 297 may provide access to one or more features associated with the identified actionable text and/or one or more features associated with the identified actionable objects. For example, the companion services module 297 may cause a selectable option (which may be of the type described above) to be displayed to allow a user to access the feature. By way of example, if the identified text is a phone number, a selectable option to initiate a phone call to the number may be displayed.

Functions and features of the companion services module 297 will be discussed in greater detail below with reference to FIG. 5 and FIG. 8.

The companion device 104 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Media Display Device

Figure 4:
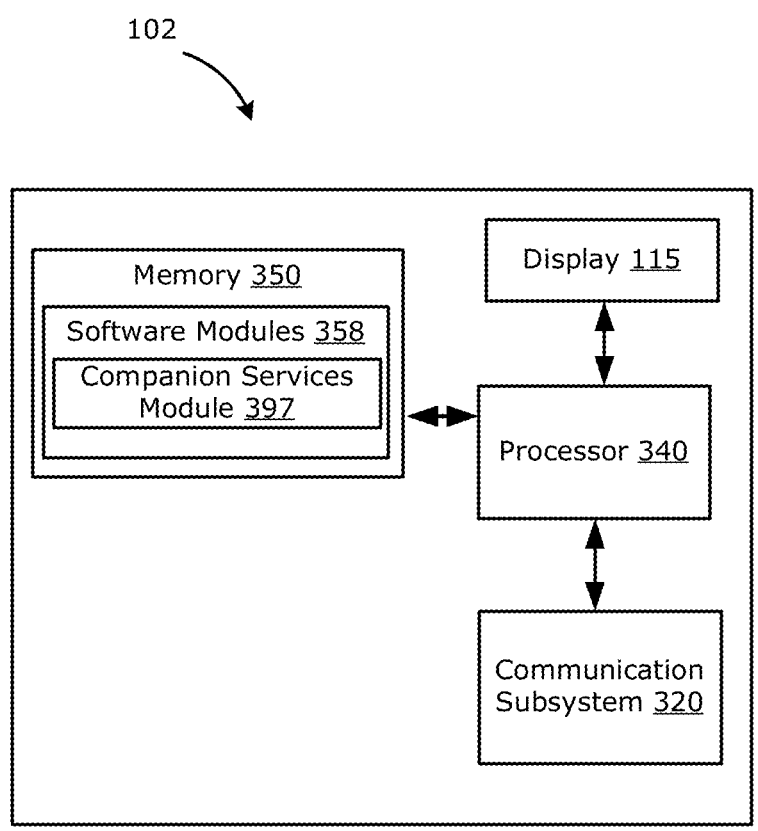
FIG. 4 is a block diagram of a media display device in accordance with example embodiments of the present disclosure.

Reference is now made to FIG. 4, which shows in block diagram form an example media display device 102. The media display device 102 is configured to display a video on a display 115 associated with the media display device 102. As noted above, in some example embodiments, the media display device 102 may be a television or a monitor.

As noted above, in some example embodiments, the media display device 102 simply acts as a passive display device, displaying video received from the companion device 104 on the display 115. However, in other example embodiments, the media display device 102 takes a more active role by causing the companion device 104 to provide companion services. In some example embodiments, the media display device 102 may analyze video to determine whether the video contains actionable text and/or to determine whether the video contains an actionable object.

The media display device 102 may include a controller, including one or more processor 340 which controls the overall operation of the media display device 102. The media display device 102 may include a memory 350 which is communicatively connected to the processor 340. The memory 350 may be configured to provide data stored in the memory 350 to the processor 340. For example, the memory 350 may include processor readable instructions for causing the processor 340 to perform a method such as, for example, one or more of the methods described below with reference to FIGS. 5 and 8.

While the memory 350 is illustrated as a single component, it will typically include multiple memory components of various types. For example, the memory 350 may include random access memory (RAM), read only memory (ROM), a hard disk drive (HDD), a solid state drive (SSD), flash memory, or other types of memory. It will be appreciated that each of these various types of memory will be best suited for different purposes and applications.

The processor 340 may operate under stored program control and may execute software modules 358 stored on the memory 350. The software modules 358 may, in some example embodiments, included a companion services module 397.

The companion services module 397 is, in some example embodiments, configured to coordinate with a companion services module 297 on the companion device 104 to provide access to one or more features which are associated with actionable text and/or an actionable object displayed in the video. In some example embodiments, the companion services module 397 of the media display device 102 may be configured to analyze the video to identify displayable text (and/or displayable objects) and to determine whether any of the identified text (and/or objects) in the video contains actionable text (and/or actionable objects). Based on the result of this analysis, the companion services module 397 of the media display device 102 may send one or more suitable instructions or commands to the companion device 104 to instruct the companion device 104 to provide access to companion features associated with the identified actionable text (and/or actionable object).

Functions and features of the companion services module 397 will be discussed in greater detail below with reference to FIGS. 5 and 8.

The memory 350 may also store other data not specifically referred to herein.

The media display device 102 includes a display 115. The display 115 may, in some example embodiments, be a liquid crystal display (LCD). In other example embodiments, the display 115 may be a light emitting diode (LED) display. In some example embodiments, the display 115 may be a touch screen display which is configured to display content and also to receive input via a touch sensitive overlay. Other types of displays may be used in other example embodiments.

The media display device 102 may include one or more communication subsystems 320 for communicating with other systems, servers, or electronic devices. For example, a communication subsystem 320 may be provided on the media display device 102 to allow the media display device 102 to communicate with the companion device 104. The communication subsystem 320 may be a wired or wireless communication subsystem. In some example embodiments, the communication subsystem is a short range communication subsystem which is configured to communicate with the short range communication subsystem 262 (FIG. 3) of the companion device 104; for example, the communication subsystem 320 may be a Wi-Fi or Bluetooth communication subsystem in some example embodiments. The communication subsystem 320 may take other forms apart from those specifically listed herein.

In some example embodiments, video may be received via the communication subsystem 320. However, it will be appreciated that video may be received via another interface in other example embodiments. In some example embodiments, video may be received from an access network 109 (FIG. 1) via a receiver (not shown), such as a tuner, associated with the media display device 104.

The media display device 102 may include other features, components, or subsystems apart from those specifically discussed herein. By way of example, the media display device 102 will include a power subsystem which interfaces with a power source for providing electrical power to the media display device 102 and its components. By way of further example, the media display device 102 may include one or more input devices. The input devices may include a navigational input device and/or an alpha numeric input device. By way of further example the input devices may include a mouse, a track pad, a track ball, a touch screen overlay, or another input device not specifically listed herein.

The software modules 358 may be logically or physically organized in a manner that is different than the manner illustrated in FIG. 4. By way of example, the features described herein with reference to the companion services module 397 may be provided by a plurality of software modules. Thus, the software modules 358 described with reference to FIG. 4 represent one possible assignment of features to software modules. However, such features may be organized in other ways in other example embodiments.

Furthermore, the media display device 102 may include other software applications or modules which provide features which are not specifically discussed herein. For example, the media display device 102 may include operating system software which controls the overall operation of the media display device 102.

Example Method for Providing Companion Services to Video

Figure 5:
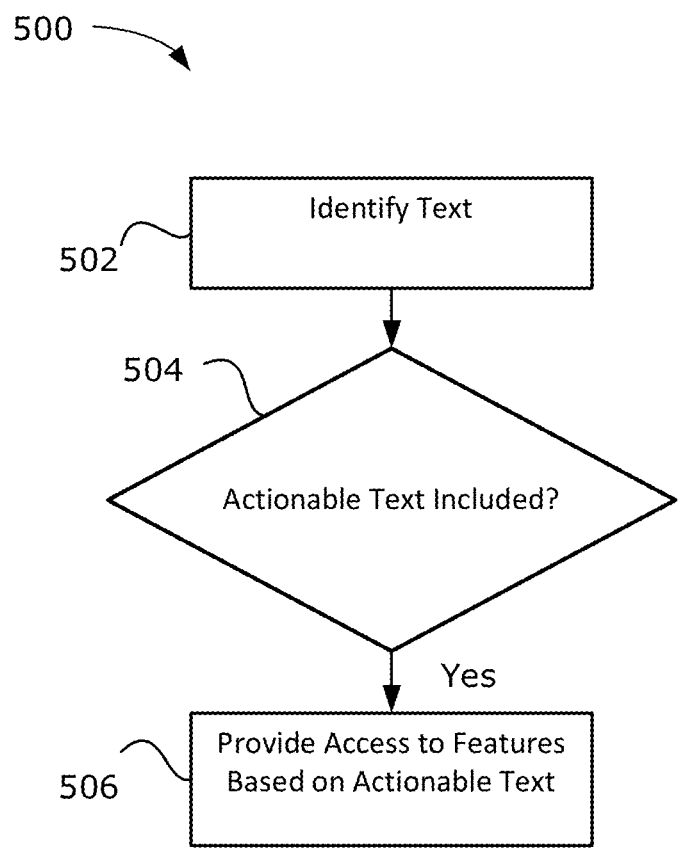
FIG. 5 is a flowchart of a method for providing access to one or more companion features on a companion device in accordance with example embodiments of the present disclosure.

Reference will now be made to FIG. 5 which illustrates an example method 500 for providing access to one or more companion features on a companion device 104. More particularly, the method 500 may be used to provide companion services for video.

The method 500 includes features which may be provided by a companion device 104, such as the companion device 104 of FIG. 3. More particularly, one or more applications or modules associated with the companion device 104, such as the companion services module 297 (of FIG. 3), may contain processor readable instructions for causing a processor 240 associated with the companion device 104 to perform the method 500 of FIG. 5. That is, in some example embodiments, the companion device 104 is configured to perform the method 500 of FIG. 5.

In some example embodiments, one or more of the features of the method 500 of FIG. 5 may be provided, in whole or in part, by another system, software application, module, or device apart from those specifically listed above. In some example embodiments, one or more of the features of the method 500 may be performed, at least in part, by the media display device 102 (of FIG. 4). In some example embodiments, one or more applications or modules associated with the media display device 102 (such as the companion services module 397) may contain processor readable instructions for causing a processor 340 associated with the media display device 102 to perform the method 500 of FIG. 5.

At 502, text contained within a video is identified. More particularly, a text-recognition algorithm may be performed on the video to identify displayable text in the video. That is, text which is displayed in one or more frames of the video may be identified.

In some example embodiments, the analysis at 502 may be a frame-based analysis. That is, in some example embodiments, at 502 one or more frames of the video may be analyzed to identify text contained in the video. In some example embodiments, all frames of the video may be analyzed. In some example embodiments, frames may be sequentially analyzed until all frames have been analyzed. In other example embodiments, not all frames may be analyzed. For example, since a single frame is displayed only briefly, the same text will typically be displayed in multiple sequential frames to allow a user sufficient time to read the text. Accordingly, in some example embodiments, 502 may be performed intermittently. That is, frames of the video may be intermittently analyzed so that not all frames are analyzed (i.e. at least some frames are skipped). In some example embodiments, frames are periodically analyzed so that, after a frame is analyzed, at least one subsequent frame is not analyzed before another frame is analyzed. Such intermittent analysis may reduce the processing power required for the text recognition analysis.

At 504, a processor performing the method 500 determines whether the identified text contains actionable text. As noted above, actionable text is text which may be acted upon. More particularly, actionable text is text for which a companion service is available on the companion device 104.

In some example embodiments, the determination regarding whether the identified text contains actionable text is performed by pattern matching. Pattern matching may compare text strings identified in the video to one or more predetermined templates associated with actionable text. For example, a template for a website address may require that the address include "www" followed by a period, followed by a text string, followed by another period, followed by another text string (i.e. www.text_string.text_string). Accordingly, in some example embodiments, at 504, the processor performing the method 500 determines if the identified text in the video contains a string of characters having one or more predetermined formats. The predetermined formats may for example correspond to: a date, an address such as a geographic address or electronic messaging address or website address, a phone number, an information network identifier (such as for example a Twitter hash tag or a Twitter address). In some example embodiments, the processor may determine if the identified text in the video contains a string of characters representing an address of a predetermined type (such as a website address, electronic messaging address and/or geographic address).

If the identified text in the video contains a string of characters having one or more predetermined formats, then the processor may determine that the video contains actionable text.

Accordingly, in some example embodiments, at 504 the processor may determine whether the video contains a phone number. Similarly, in some example embodiments, at 504, the processor may determine whether the video contains a website address. Similarly, in some example embodiments, at 504, the processor may determine whether the video contains an email address. Similarly, in some example embodiments, at 504, the processor may determine whether the video contains a geographic address (i.e. a real-world address). Similarly, in some example embodiments, at 504, the processor may determine whether the video contains contact information (contact information may be any information associated with a person or company which may be useful for the purposes of contacting the person or company, such as a geographic address, a phone number, etc.). Similarly, in some example embodiments, at 504, the processor may determine whether the video contains a date.

502 and/or 504 may be performed by either the media display device 102, the companion device 104, or both. The selection of the specific device 102, 104 to perform 502 or 504 may depend on the location of the video (e.g. in example embodiments in which the companion device 104 has access to the video then the companion device 104 may perform the analysis described with respect to 502 and 504 but the media display device 102 may perform the analysis in example embodiments in which the companion device 104 does not have access to the video), and may also depend on processing capabilities of the devices (e.g. in some example embodiments in which both devices have access to the video, then 502 and 504 may be performed by whichever device has greater processing capability).

Since the same actionable text may be displayed in multiple frames (such as multiple successive frames), some filtering may be performed on identified actionable text to ensure that the same actionable text on different frames of the same video does not create multiple instances of selectable options. In some embodiments, prior to proceeding to 506, the method 500 may determine whether a selectable option has already been created based on the same actionable text. If so, then the actionable text may be ignored. If not, then processing may resume at 506.

Figure 6:
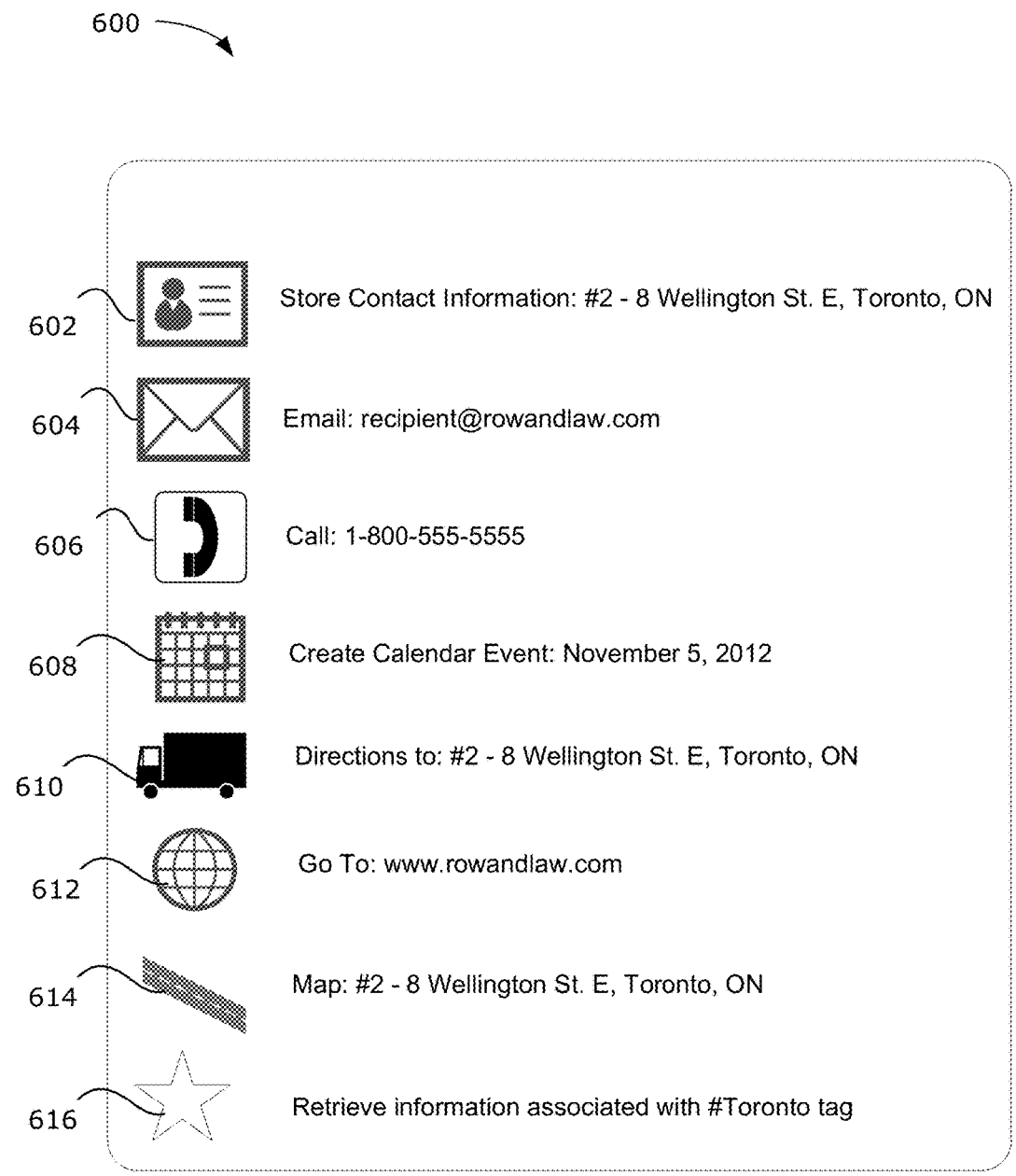
FIG. 6 is an example companion services screen in accordance with example embodiments of the present disclosure.

If the video is determined to include actionable text, at 506, access to one or more companion features may be provided on the companion device 104 based on the actionable text. In some example embodiments, when actionable text is identified in the video, one or more selectable options may be displayed on the display of the companion device 104 based on the actionable text. The nature and function of the selectable options which are displayed may depend on a type associated with the actionable text. That is, different types of actionable text may result in different types of options being displayed on the companion device 104. Some of the various types of selectable options which may be displayed will now be discussed. Examples of these selectable options are illustrated in FIG. 6 and will be discussed below.

In some example embodiments, if a phone number is identified in the video, then a selectable option to initiate a communication to the phone number identified may be provided on the companion device 104. Similarly, if a website address is identified in the video, then a selectable option to navigate to the website address using a web browser may be provided on the companion device 104. If an electronic messaging address (such as an email messaging address) is identified in the video, then a selectable option to compose an email having a recipient field populated with the email address may be displayed on the companion device 104. If a geographic address is identified in the video, then a selectable option to display a map associated with the geographic address may be provided on the companion device. In some example embodiments, if a geographic address is identified in the video, then a selectable option to navigate (i.e. provide directions to) to the geographic address is displayed. In some example embodiments, if the video contains contact information such as, for example, an address or phone number, then a selectable option may be provided on the companion device 104 to store the contact information in an address book. In some example embodiments, if a date is identified in the video, then a selectable option to create a calendar event based on the date is provided on the companion device 104. In some example embodiments, if an information network identifier (such as for example a Twitter address or hash tag) is identified in the video, then a selectable option to access the information network is provided on the companion device 104. Other types of selectable options may be provided in other example embodiments.

In some example embodiments, at 506, the processor may provide access to a feature based on the actionable text by adding a link to the feature to a list which includes links to other features based on other actionable text identified in the video. Each link may be a selectable option associated with specific actionable text. Accordingly, in some example embodiments, the companion device 104 may maintain a running list of links to features associated with actionable text displayed in the video. Features associated with actionable text displayed earlier in the video may have a less prominent position (e.g. may be displayed lower) than features associated with actionable text displayed later in the video. In some example embodiments, a user of the companion device 104 may be permitted to select one or more of the links as favorites. Selecting a link as a favorite may cause the link to remain in a more prominent position on the list and/or may cause the link to be included in the list for a longer period of time than if the same link was not selected as a favorite.

In some example embodiments, the links may also be operable to cause the point of playback of the video to be adjusted to the point in the video where the actionable text associated with the link was displayed. For example, selection of the link may cause the video to be rewound to a frame which includes the actionable text associated with the link. The video may be paused on that frame (and in an example embodiment, the actionable text is highlighted) or playback of the video may automatically be resumed beginning at that frame.

In some example embodiments, for at least some types of actionable text, rather than providing a selectable option on the companion device 104 when such actionable text is identified, the companion device 104 may instead automatically perform a function, feature or service on the companion device 104 associated with the actionable text. In some example embodiments, in response to identifying a website address in the video, a web browser on the companion device 104 may automatically navigate to the website address.

In some example embodiments, 506 may be performed during playback of the video on the media display device 102. For example, while video is being displayed on the media display device 102, the companion device 104 may provide access to features based on the actionable text. In some example embodiments, after actionable text is displayed on the display associated with the media display device 102, the selectable option associated with that actionable text may be displayed on the companion device 104.

As noted above, in some example embodiments, the method 500 of FIG. 5 may be performed by the companion device 104. In such example embodiments, the companion device 104 may have access to the video. For example, the companion device 104 may access the video from a web server accessible over a network 131 (FIG. 2) or from a data store 127 associated with the companion device 104. In some example embodiments, the method 500 may include a step (not shown) of streaming (or otherwise providing) the video to the media display device 102 for playback on the media display device 102.

In other example embodiments, the method 500 may be performed by the media display device 102. In such example embodiments, the method may include a step (not shown) of displaying the video on the media display device 102. More particularly, the method may include a step of displaying the video on a display 115 of the media display device 102. In some example embodiments, at 506 the media display device 102 may provide access to the one or more features based on the actionable text by sending a command to the companion device 104 to instruct the companion device to provide access to the one or more features based on the actionable text. That is, when the media display device 102 identifies actionable text, it may cause the companion device 104 to provide access to the features based on the actionable text. For example, it may instruct the media display device 102 to display a suitable selectable option based on the actionable text.

Example Selectable Options

Referring now to FIG. 6, an example companion services screen 600 is illustrated. The companion services screen 600 includes a plurality of selectable options which may be generated on a display of the companion device 104 based on actionable text identified in video. The selectable options are interface elements which may be selected using an input interface 206 associated with the companion device 104. In the example embodiment illustrated, the selectable options identify the actionable text which caused that selectable option to be displayed (e.g. they identify the specific email address, phone number, etc. which was identified in the video).

A create-contact-record selectable option 602 may be displayed to provide a user with a selectable option to create a contain record based on actionable text which identifies contact information. In the example embodiment illustrated, the actionable text which caused the create-contact-record selectable option 602 to be displayed was a geographic address (e.g. "#2-8 Wellington St. E. Toronto ON").

An electronic-messaging selectable option 604 may be displayed to provide a user with a selectable option to create an electronic message based on actionable text which identifies an email address. In the example embodiment illustrated, the actionable text which caused the electronic-messaging selectable option 604 to be displayed was an email address (e.g. recipient@rowandlaw.com).

A call-phone selectable option 606 may be displayed to provide a user with a selectable option to call a phone number identified in the video. The call phone selectable option 606 may identify the phone number (e.g. 1-800-555-5555) which caused the call-phone selectable option 606 to be displayed.

A create-calendar-event selectable option 608 may be displayed to provide a user with a selectable option to create a calendar event based on a date identified in the video. The create calendar event selectable option 608 may identify the date (e.g. Nov. 5, 2012) which caused the create-calendar-event selectable option 608 to be displayed.

A navigation selectable option 610 may be displayed to provide a user with a selectable option to provide directions to a geographic address identified in the video. The navigation selectable option 610 may specify the geographic address which was identified in the video and which caused the navigation selectable option 610 to be displayed.

A go-to-website selectable option 612 may be displayed to provide a user with a selectable option to cause a web browser to navigate to a website address identified in the video. The go-to-website selectable option 612 may specify this website.

A display-map selectable option 614 may be displayed to provide a user with a selectable option to display a map associated with a geographic address contained in the video. The display-map selectable option 614 may specify this geographic address.

An access-an-information-network selectable option 616 may be displayed to provide a user with a selectable option to access the information network associated with an information network identifier (such as for example a Twitter address or hash tag) contained in the video. The access-an-information-network selectable option 614 may specify the information network identifier.

Other types of selectable options may be displayed instead of or in addition to the selectable options illustrated in FIG. 6.

In some example embodiments (not shown), the companion services screen 600 may also include a video display window (not shown). The video display window may display the video associated with the selectable options displayed in the companion services screen 600. In some example embodiments, the video display window on the companion device may be synced to the media display device 102 so that both the companion device 104 and the media display device 102 display common frames from the video at common times.

In some example embodiments (not shown), one or more of the selectable options may have a visual indicator which points to the actionable text in the video which caused the creation of the selectable option. In some embodiments, a line may be displayed which links a selectable option to actionable text displayed in the video display window which is associated with that selectable option. The line may, in some example embodiments, be displayed only while the actionable text associated with the selectable option persists in the video display window. That is, when the actionable text associated with the selectable option is no longer displayed in the video display window, the line may be removed. In some example embodiments, the line may react to changes in the position of the actionable text within the video. For example, if the position of the actionable text moves within the video (e.g. up, down, left, right, diagonal, etc.), then the line may move accordingly so that the line follows the actionable text.

In some example embodiments, selection of one of the selectable options may cause the playback of the video to be paused. Playback of the video may be paused on either the companion device 104 (e.g. in the video display window discussed above), the media display device 102, or both.

Providing Companion Services During a Pause of Video

Figure 7:
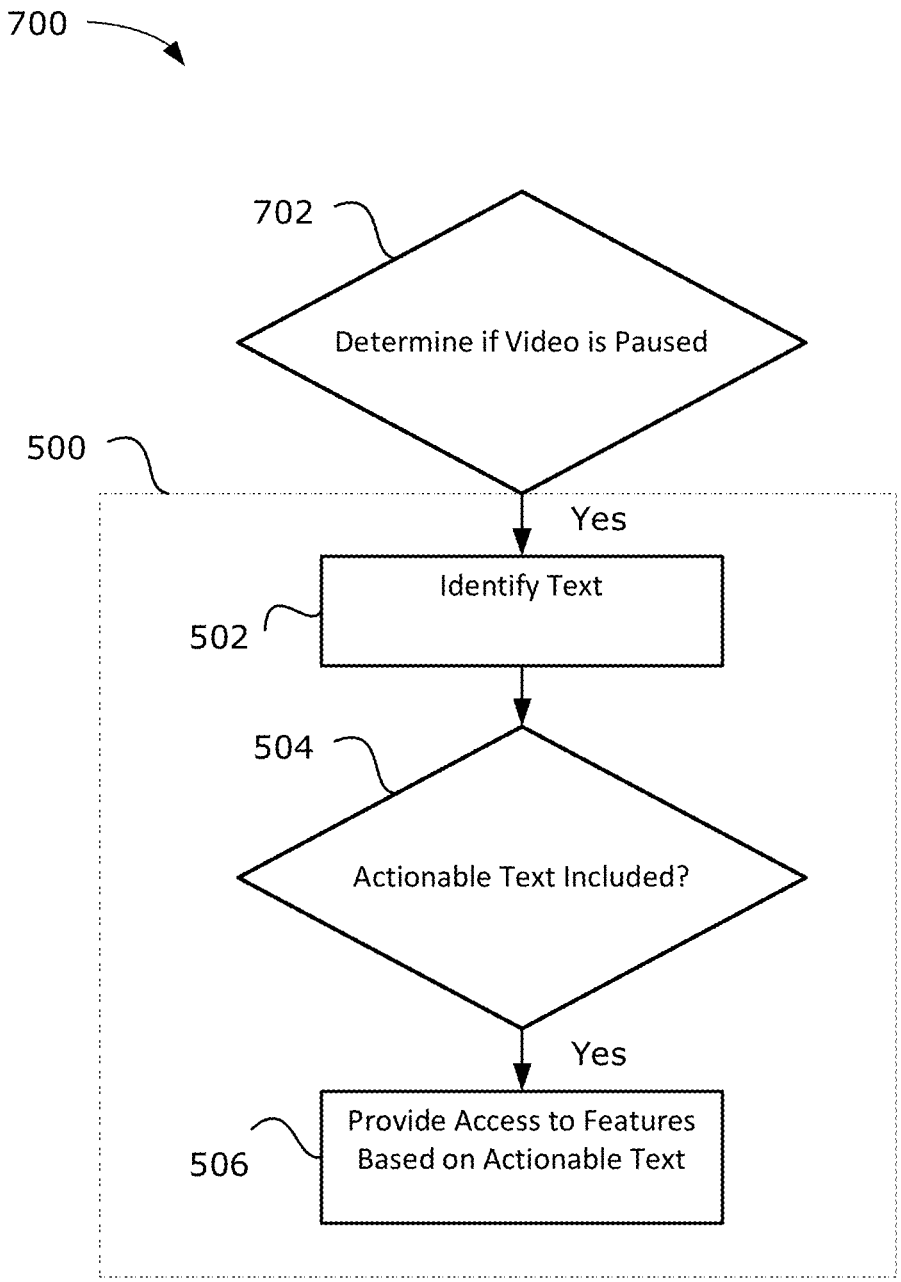
FIG. 7 is a flowchart of a method for providing access to one or more companion features on a companion device in accordance with example embodiments of the present disclosure.

Referring now to FIG. 7, a further example of a method 700 for providing access to one or more companion features on a companion device 104 is illustrated in flowchart form. The method 700 may be used to provide companion services for video.

The method 700 includes features which may be provided by a companion device 104, such as the companion device 104 of FIG. 3. More particularly, one or more applications or modules associated with the companion device 104, such as the companion services module 297 (of FIG. 3), may contain processor readable instructions for causing a processor 240 associated with the companion device 104 to perform the method 700 of FIG. 7. That is, in some example embodiments, the companion device 104 is configured to perform the method 700 of FIG. 7.

In some example embodiments, one or more of the features of the method 700 of FIG. 7 may be provided, in whole or in part, by another system, software application, module, or device apart from those specifically listed above. In some example embodiments, one or more of the features of the method 700 may be performed, at least in part, by the media display device 102 (of FIG. 4). In some example embodiments, one or more applications or modules associated with the media display device 102 (such as the companion services module 397) may contain processor readable instructions for causing a processor 340 associated with the media display device 102 to perform the method 700 of FIG. 7.

The method 700 of FIG. 7 includes features which are described above with reference to the method 500 of FIG. 5.

In the method 700 of FIG. 7, at 702, a determination is made regarding whether the playback of the video has been paused. The video is only analyzed at 502 if it is determined that the video is paused. That is, pausing playback of the video acts as a trigger to cause the method 500 (and operations 502, 504 and 506) described above with reference to FIG. 5 to be performed.

In some example embodiments, when the video is paused, then at 502, the identification of text in the video may be performed by analyzing the frame of the video displayed during the pause. The text identified in the frame displayed during the pause may then be used, at 504, to determine if the identified text in the video contains actionable text.

If the text contains actionable text, then at 506, access to one or more features may be provided based on the actionable text in the manner described above with reference to FIG. 5.

While the example embodiments described above have generally described analyzing displayable video to identify actionable text, in other example embodiments, an audio-based analysis may be performed to determine whether the audio component of the video contains any actionable text.

Furthermore, while the example embodiments described above have generally described systems in which video display and companion services are provided on separate devices (e.g. video is displayed on a media display device 102 and companion services for that video are provided on a companion device 104), in other example embodiments, a single device may provide both video display and companion services. Such a device may be referred to as a media display device or a companion device since it provides both media display functions and companion services. In some example embodiments, the device may display video. When the video contains actionable text (which may be identified in the manner described above), the device may allow a user to select an option to activate a companion feature on the device based on the actionable text.

In some example embodiments, actionable text may be modified on the displayed video to indicate that such text is actionable. For example, the appearance of actionable text may be modified (e.g. by underlining or highlighting the text). In some embodiments, a hyperlink to a feature associated with actionable text may be created on the frames of the video which contain the actionable text so that interaction with the text causes the device to access the feature associated with the actionable text. For example, if the actionable text is a phone number, then a hyperlink may be created so that the phone number may be selectable. Selection of the phone number may, for example, cause a phone call to be initiated to the phone number.

Some example embodiments discussed above referred to example embodiments in which the media display device 102 identified actionable text within the video. However, in other example embodiments, this identification may be performed on the companion device 104. In some example embodiments, the media display device 102 may identify text in the video and may stream such text to the companion device 104. The companion device 104 may then make the determination regarding whether the text represents actionable text. In other example embodiments, the companion device 104 may have access to the video and may, itself, identify actionable text in the video.

Providing Companion Services Based on Actionable Object

Figure 8:
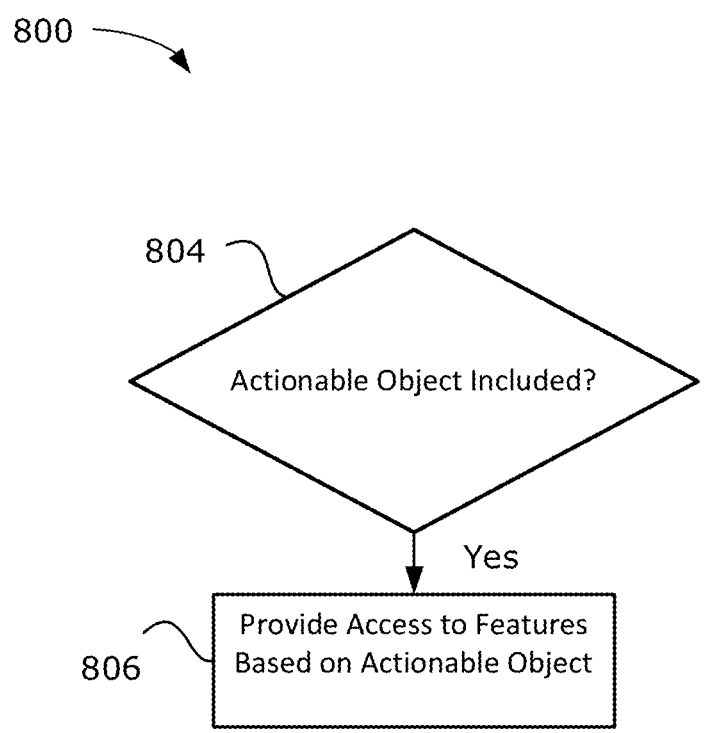
FIG. 8 is a flowchart of a method for providing access to one or more companion features on a companion device in accordance with example embodiments of the present disclosure.

Reference will now be made to FIG. 8 which illustrates a further example method 800 for providing access to one or more companion features on a companion device 104. More particularly, the method 800 may be used to provide companion services for video.

The method 800 includes features which may be provided by a companion device 104, such as the companion device 104 of FIG. 3. More particularly, one or more applications or modules associated with the companion device 104, such as the companion services module 297 (of FIG. 3), may contain processor readable instructions for causing a processor 240 associated with the companion device 104 to perform the method 800 of FIG. 8. That is, in some example embodiments, the companion device 104 is configured to perform the method 800 of FIG. 8.

In some example embodiments, one or more of the features of the method 800 of FIG. 8 may be provided, in whole or in part, by another system, software application, module, or device apart from those specifically listed above. In some example embodiments, one or more of the features of the method 800 may be performed, at least in part, by the media display device 102 (of FIG. 4). In some example embodiments, one or more applications or modules associated with the media display device 102 (such as the companion services module 397) may contain processor readable instructions for causing a processor 340 associated with the media display device 102 to perform the method 800 of FIG. 8.

The method 800 may, in some example embodiments, be triggered when the video is paused. That is, a pause of the video may cause the method 800 to be initiated. The media display device 102 may determine if the playback of the video has been paused and may only perform the method 800 when it is determined that the playback of the video has been paused. Other triggers may be used in other example embodiments to initiate the method 800.

In some example embodiments, at 804, an image-based search is performed on a video to determine whether the video includes an actionable object. The image-based search may compare one or more frames of the video to objects represented in an actionable object database. In some example embodiments, the image-based search may identify an object displayed in a frame. The image-based search may separate a frame into objects or components that are displayed in the frame. Each object or component may represent a separate real-world object or component. For example, a building object, representing a building, may be separated from other portions of a frame. Then, in some example embodiments, the image-based search may attempt to determine whether the separated objects correspond to any objects represented in the actionable object database.

In some example embodiments, at 804, the image-based search may be facial recognition. That is, at 804, facial recognition may be performed on one or more frames of the video to determine whether the video includes a famous person. This determination may be made by comparing features of the one or more frames to features in a famous persons database. The famous persons database includes information representing facial features of a plurality of famous persons (such as for example actors and historical figures) and may also include identification information (e.g. a name) for such persons. The information representing facial features may be an image or images of the person. That is, the famous persons database may include images of famous persons. The image-based search may compare one or more frames of the video with the images to determine whether the famous person represented by the image is displayed in the video.

In some example embodiments, at 804, the image-based search may be a location-recognition search to identify a location (such as for example a city) represented in the video. That is, at 804, location recognition may be performed on one or more frames of the video to determine whether the video displays features of a particular location. This determination may be made by comparing features of the one or more frames to features in a location features database. The location features database includes information representing features of a plurality of locations. Such information may be used to identify a location and/or features at that location. For example, such information may include information regarding the skyline of the location and/or information regarding buildings located at the location. The image-based search may automatically compare one or more frames of the video with the location features database to determine whether a feature in the database is displayed in the video.

In some example embodiments, at 804, the image-based search may be a product-recognition search, to identify a product represented in the video. That is, at 804, product recognition may be performed on one or more frames of the video to determine whether the video displays a known product. This determination may be made by comparing features of one or more frames to features in a product database. The product database includes information representing features of a plurality of products. For example, the product database may include product images illustrating products. The product database may also include identification information (such as a name) identifying the products. In some embodiments, at 804, one or more frames of the video may be compared with the product images to determine whether the product associated with the product images is displayed in the video.

In some example embodiments, at 804, the image-based search may be a bar code search, to then provide information associated with a bar code in the video. That is, at 804, a bar code search may be performed on one or more frames of the video to determine whether the video displays a bar code.

In some example embodiments, the analysis at 804 may be a frame-based analysis. That is, in some example embodiments, at 804 one or more frames of the video may be analyzed to identify actionable objects contained in the video. In some example embodiments, all frames of the video may be analyzed. In some example embodiments, frames may be sequentially analyzed until all frames have been analyzed. In other example embodiments, not all frames may be analyzed. For example, since a single frame is displayed only briefly, the same object will typically be displayed in multiple sequential frames to allow a user sufficient time to visually process the object. Accordingly, in some example embodiments, 804 may be performed intermittently. That is, frames of the video may be intermittently analyzed so that not all frames are analyzed (i.e. at least some frames are skipped). In some example embodiments, frames are periodically analyzed so that, after a frame is analyzed, at least one subsequent frame is not analyzed before another frame is analyzed. Such intermittent analysis may reduce the processing power required for the object recognition analysis.

Where the method 800 is triggered in response to a pausing of the video, in some example embodiments, 804 may be performed on the frame of the video displayed while the playback of the video is paused. That is, the frame displayed while playback of the video is paused may be analyzed at 804 and other frames, which are not displayed, may not be analyzed at this time.

If the video includes an actionable object, then at 806 the method 800 may provide access to one or more companion features based on the actionable object. Such access may be provided in the same manner as described above with reference to 506 of FIG. 5. In some example embodiments, when an actionable object is identified in the video, one or more selectable options may be displayed on the display of the companion device 104 based on the actionable object. The nature and function of the selectable options which are displayed may depend on a type associated with the actionable object. That is, different types of actionable objects may result in different types of options being displayed on the companion device 104. Some of the various types of selectable options which may be displayed will now be discussed. In some example embodiments, access to the companion features may be provided on the companion device 104 during playback of the video on the media display device 102.

In some example embodiments, if a famous person is identified in the video, then a selectable option may be displayed to provide access to information about the person. Selection of the selectable option may cause information about the person (such as a date of birth, date of death, list of credits, etc.) to be displayed. Alternatively, in some example embodiments, instead of displaying the selectable option, the information about the person may automatically be displayed when the actionable object is identified. In some example embodiments, the information about the person and/or the selectable option may be displayed on a display associated with the companion device 104 while playback of the video is provided on the media display device 102. The information may, in some example embodiments, be obtained from the selectable object database (e.g. the famous persons database).

In some example embodiments, if a location or a feature of a location is identified in the video, then a selectable option may be displayed to provide access to information about the location or feature. Selection of the selectable option may cause information about the location or feature to be displayed (such as a city population, a map illustrating where at the location the feature is located, a map illustrating population density, a list of recent and upcoming events, recommendations for hotels or tourist attractions, etc.). Alternatively, in some example embodiments, instead of displaying the selectable option, the information about the location or feature may automatically be displayed when the actionable object is identified. In some example embodiments, the information about the location or feature and/or the selectable option may be displayed on a display associated with the companion device 104 while playback of the video is provided on the media display device 102. The information may, in some example embodiments, be obtained from the selectable object database (e.g. the location features database).

In some example embodiments, if a product is identified in the video, then a selectable option may be displayed to provide access to information about the product. Selection of the selectable option may cause information about the product to be displayed (such as the name of the product, manufacturer, retail information, etc.). Alternatively, in some example embodiments, instead of displaying the selectable option, the information about the product may automatically be displayed when the actionable object is identified. In some example embodiments, the information about the product and/or the selectable option may be displayed on a display associated with the companion device 104 while playback of the video is provided on the media display device 102. The information may, in some example embodiments, be obtained from the selectable object database (e.g. the product database).

In some example embodiments, if a product is identified in the video, then a selectable option may be displayed to purchase the product. Selection of the selectable option may, in some example embodiments, initiate an ecommerce process which allows the product to be purchased over the Internet. In some example embodiments, selection of the selectable option to purchase the product may cause an Internet browser (or ecommerce application) associated with the companion device 104 to navigate to an ecommerce website or portal. In some example embodiments, a parameter may be added to a website address associated with the ecommerce website when navigating to the website address to allow a web server associated with the website address to associate access of the website with a referrer. That is, an identifier associated with a referrer may be added to the website address (which may be a URL). The identifier may be unique to a referrer to allow the web server to identify the referrer. The referrer may, for example, be the manufacturer and/or distributor of the companion device and/or a software developer associated with the companion services module 297. Tracking the referrer may, for example, allow the referrer to receive compensation from an operator of the web server for the referral.

In some example embodiments, if a bar code is identified in the video, then a selectable option may be displayed to scan the bar code and provide information associated with the bar code. Selection of the selectable option may, in some example embodiments, initiate a bar code scanning application associated with the companion device 104 and provide to the bar code scanning application the bar code for processing.

While the present application described analysis of a displayable component of video, similar techniques may be employed to analyze an audio component of video. For example, audio may be analyzed to determine whether the audio contains a song and to identify a song contained in the audio component and access to companion features may be provided on the companion device 104 based on the song identified. For example, information about the song may be displayed and/or a selectable option to purchase the song may be displayed.

While the present application is primarily described in terms of methods, a person of ordinary skill in the art will understand that the present application is also directed to various apparatus such as a handheld electronic device and a server. The handheld electronic device and the server includes components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method performed by a processor of providing companion services to a companion device associated with a media display device, the method comprising:
   detecting video being displayed on the media display device;
   in response to detecting video being displayed, automatically identifying text contained within the video;
   determining, by performing pattern matching, if the identified text in the video contains one or more actionable text;
   if the identified text in the video contains one or more actionable text, providing access to one or more features at the companion device based on the one or more actionable text while playback of the video is being provided on the media display device,
      wherein providing access to the one or more features includes adding an actionable link to an actionable object list, and wherein the added actionable link is associated with the identified one or more actionable text, and wherein the added actionable link is a link to an operation,
      and wherein when the actionable object list contains two or more actionable links, each actionable link in the actionable object list is a link to a unique operation, and wherein the actionable object list is a running list of added actionable links that includes actionable links associated with previously identified one or more actionable text; and
   providing instructions to display at the companion device the added actionable links in the actionable object list based on an order in which the one or more actionable text associated with the added actionable links were identified in the video.

2. The method of claim 1, wherein providing access to one or more features comprises:
   providing an actionable link to create a calendar event based on the one or more actionable text.

3. The method of claim 2, wherein the calendar event comprises a reminder, a meeting or an alarm.

4. The method of claim 2, wherein the calendar event comprises a meeting request.

5. The method of claim 2, wherein the calendar event comprises an alarm.

6. The method of claim 1, further comprising:
   determining that playback of the video has been paused, and wherein identifying text contained within a video comprises:
   identifying text contained within a frame of the video displayed while the playback of the video has been paused.

7. The method of claim 1, wherein determining if the identified text in the video contains one or more actionable text comprises:
   determining if the identified text in the video contains a string of characters having one or more predetermined formats.

8. The method of claim 1, wherein identifying text contained in the video comprises:
   analyzing one or more frames of the video to identify text contained in the video.

9. The method of claim 1, wherein identifying text contained in the video comprises:
   intermittently analyzing frames of the video.

10. The method of claim 1, wherein providing access to one or more features comprises automatically performing a function associated with the one or more actionable text on the companion device.

11. The method of claim 1, further comprising:
    receiving a favorite indicator corresponding to a selected actionable link in the actionable object list and associating the favorite indicator to the selected actionable link; and
    persistently displaying the selected actionable link associated with the favorite indicator at the start of the actionable object list.

12. The method of claim 1, further comprising:
    detecting selection of an actionable link in the actionable object list; and
    resuming playback of the video at a point in time where the one or more actionable text associated with the selected actionable link was determined.

13. An electronic device comprising:
    a memory; and
    a processor coupled to the memory, the processor being configured to:
    detect video being displayed on the media display device;
    in response to detecting video being displayed, automatically identify text contained within the video;
    determine, by performing pattern matching, if the identified text in the video contains one or more actionable text;
    if the identified text in the video contains one or more actionable text, provide access to one or more features based on the one or more actionable text while playback of the video is being provided on the media display device,
       wherein providing access to the one or more features includes adding an actionable link to an actionable object list, and wherein the added actionable link is associated with the identified one or more actionable text, and wherein the added actionable link is a link to an operation,
       and wherein when the actionable object list contains two or more actionable links, each actionable link in the actionable object list is a link to a unique operation, and wherein the actionable object list is a running list of added actionable links that includes actionable links associated with previously identified one or more actionable text; and
    provide instructions to display at the companion device the added actionable links in the actionable object list based on an order in which the one or more actionable text associated with the added actionable links were identified in the video.

14. The electronic device of claim 13 further comprising:
a display coupled to the processor for displaying the video;
a short range communications subsystem coupled to the processor for sending a command to a companion device to instruct the companion device to provide the access to one or more features based on the one or more actionable text.

15. The electronic device of claim 13, further comprising:
a short range communication subsystem coupled to the processor for providing the video to the media display device for playback on the media display device, and wherein the one or more features are provided on the electronic device.

16. A method performed by a processor of providing companion services to a companion device associated with a media display device, the method comprising:
detect video being displayed on the media display device;
in response to detecting video being displayed, automatically determining if the video includes an actionable object associated with a product;
if the video includes the actionable object associated with the product, performing product-recognition to identify the product represented in the video;
providing, at the companion device, access to one or more companion features based on the identified product while playback of the video is being provided on the media display device, wherein providing access to one or more companion features includes adding a referrer identifier to a referrer object list, and wherein the referrer identifier is a link to a website address to associate access of the website address with a referrer, and wherein the referrer object list is a running list of added referrer identifiers that includes referrer identifiers associated with previously identified actionable objects associated with products; and
providing instructions to display the added referrer identifiers in the referrer object list based on an order in which the actionable objects associated with the added referrer identifiers were identified in the video.

17. The method of claim 16, wherein providing access to the one or more companion features based on the identified product further comprises:
providing access to the website address; and
providing a selectable option to purchase the product.

18. The method of claim 16, wherein providing access to the one or more companion features based on the identified product further comprises:
tracking a number of accesses to the website address associated with the referrer identifier to provide compensation to the referrer.

* * * * *